United States Patent [19]

Obrecht

[11] Patent Number: 4,830,520
[45] Date of Patent: May 16, 1989

[54] METHOD OF PROTECTING A LIMITED-DISPLACEMENT MECHANICAL SYSTEM AGAINST AN AGRESSIVE MEDIUM

[75] Inventor: Georges Obrecht, Pont de Claix, France

[73] Assignee: Alsthom-Atlantique, Paris, France

[21] Appl. No.: 119,271

[22] Filed: Nov. 9, 1987

Related U.S. Application Data

[63] Continuation of Ser. No. 625,160, Jun. 27, 1984, abandoned.

[30] Foreign Application Priority Data

Jun. 27, 1983 [FR] France ............... 83 10569
Aug. 3, 1983 [FR] France ............... 83 12808

[51] Int. Cl.⁴ .................................. F16C 33/76
[52] U.S. Cl. ........................... 384/477; 384/478; 384/906; 277/135; 277/136
[58] Field of Search ............ 277/72 FM, 135, 136; 384/526, 527, 576, 477, 478, 906; 105/226; 74/574; 464/20, 91

[56] References Cited

U.S. PATENT DOCUMENTS

| | | | |
|---|---|---|---|
| Re. 30,257 | 4/1980 | Fox | 308/DIG. 9 |
| 2,456,496 | 12/1948 | Ford et al. | 308/DIG. 9 |
| 2,795,398 | 6/1957 | Ragland | 464/20 |
| 3,323,326 | 6/1967 | Vertson | 74/574 |
| 3,366,514 | 1/1968 | Chada et al. | 427/387 |
| 3,368,928 | 2/1968 | Chada et al. | 427/387 |
| 3,467,596 | 9/1969 | Hermann | 252/12 |
| 3,505,099 | 4/1970 | Neuroth | 427/387 |
| 3,623,782 | 11/1971 | Nakanishi et al. | 384/906 |
| 3,878,695 | 4/1975 | Pitner | 464/91 |
| 4,095,803 | 6/1978 | Meier et al. | 277/136 |
| 4,111,499 | 9/1978 | McCloskey | 308/DIG. 8 |
| 4,113,825 | 9/1978 | Hill et al. | 264/262 |
| 4,116,920 | 9/1978 | Honma et al. | 252/12 |
| 4,223,963 | 9/1980 | Glodin et al. | 384/527 |
| 4,257,245 | 3/1981 | Toelke et al. | 464/20 |
| 4,261,425 | 4/1981 | Bodine | 175/106 |
| 4,268,237 | 5/1981 | Wolters | 277/72 FH |
| 4,392,695 | 7/1983 | Miller | 384/477 |

FOREIGN PATENT DOCUMENTS

| | | | |
|---|---|---|---|
| 0026100 | 4/1981 | European Pat. Off. | |
| 1171813 | 1/1959 | France | |
| 2414154 | 8/1979 | France | |
| 981980 | 2/1965 | United Kingdom | 277/72 FM |

Primary Examiner—Lenard A. Footland
Attorney, Agent, or Firm—Sughrue, Mion, Zinn, Macpeak, and Seas

[57] ABSTRACT

The mechanical system is surrounded by a protective chamber (33) and is filled with a liquid material which is transformed in situ into a resilient material that adheres to the inside walls of the chamber and which protects the operative surfaces of the mechanical system.

8 Claims, 2 Drawing Sheets

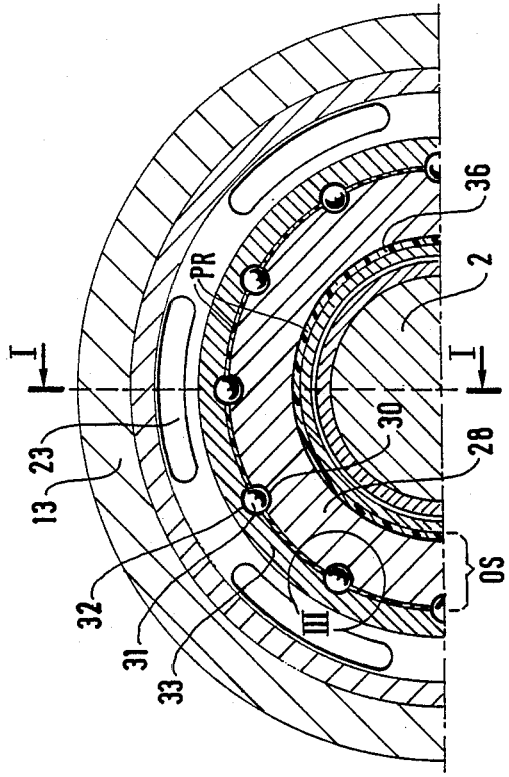
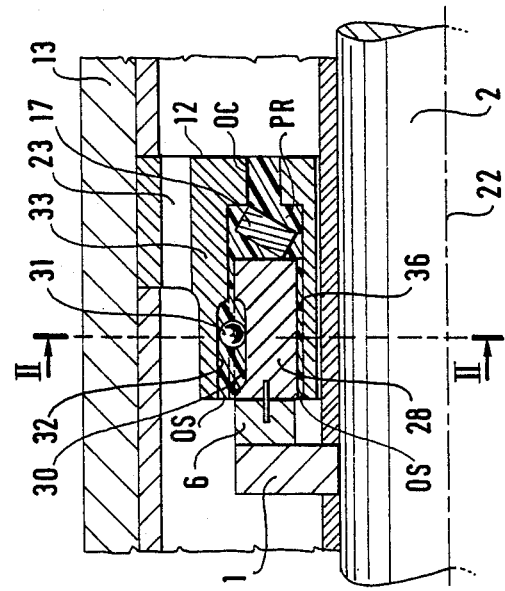
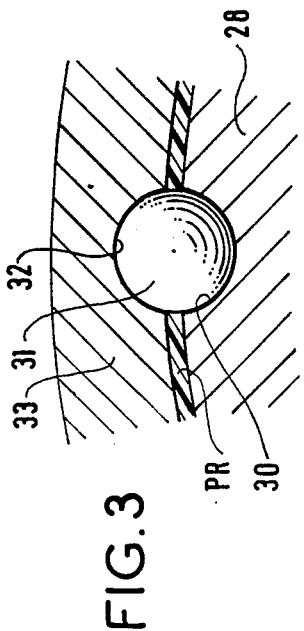

METHOD OF PROTECTING A LIMITED-DISPLACEMENT MECHANICAL SYSTEM AGAINST AN AGRESSIVE MEDIUM

This is a continuation of application Ser. No. 625,160 filed June 27, 1984, abandoned.

The present invention relates to a method of protecting a limited-displacement mechanical system against an aggressive medium.

FIELD OF THE INVENTION

The term "mechanical system" is used herein to designate assembly including a plurality of relatively movable parts having hard operative surfaces. Such parts may be made of steel, for example. The operative surfaces may co-operate by rolling, sliding, abutting, or the like, ie. forces are transmitted between the hard surfaces by periods of contact which may be temporary. Meshed gears or a ball bearing constitute such a "mechanical system", whereas a simple spring suspension does not constitute such a "mechanical system".

The term "limited-displacement" is used herein in relation to such a mechanical system when the distances moved by the various points on the operative parts relative to one another and from a given starting configuration never exceed a maximum linear amplitude substantially equal to the size of the system. Such "limited displacement" may be constituted by alternating displacement of a part within the system or by a single direction displacement of small amplitude which occurs only once within the system lifetime. Continuous single direction rotation of a shaft about its axis does not constitute such "limited displacement".

The aggressive medium may be chemically aggressive or it may convey abrasive particles capable of deteriorating the operative surfaces of the mechanical system. Such conditions are to be found, for example, down a borehole being drilled by an underground or "downhole" motor. The motor is constituted by a turbine which is driven by drilling mud. The drilling mud is injected under pressure from above down a string of tube and then returns back up by flowing round the outside of the tubes. The mud conveys particles of silica. Limited displacement mechanical systems may be present at the bottom of the borehole, in which case they need to be protected from erosion by the mud. An example of one such system is described in greater detail below.

Regardless of the nature of the aggressive medium in which the mechanical system is to be used, the mechanical system includes in conventional manner a rigid protective chamber which surrounds the operative surfaces and sufficient internal volume for them to perform their movements. The chamber must have at least one outlet opening to pass a link member which is fixed to an operative part inside the chamber and serves to transmit movement of the operative part to the outside of the chamber. There must be a degree of play around the link member to enable it to move.

The protective chamber may be constituted by the outer surface of an operative part, or it may be constituted by a casing specially provided to afford protection.

The protective chamber provides effective protection against some kinds of aggressive media, in particular it protects the operative surfaces from being eroded by particles which are too big to pass through the above-mentioned play. However, the protective chamber often provides inadequate protection against chemical attack (e.g. oxidation) or against erosion by fine abrasive particles. That is why there are various well-known prior art methods of providing additional protection for the operative surfaces.

BACKGROUND OF THE INVENTION

One such prior art method consists in filling the protective chamber with a material that permits the required relative movements of the operative parts while preventing the extenral medium from coming into contact with the operative surfaces.

One such filler material is a grease of sufficient thickness to prevent it from escaping via the above-mentioned play. Unfortunately, under adverse conditions, e.g. including large variations in temperature at high pressures, experience shows that grease escapes progressively thus progressively admitting the aggressive medium, e.g. abrasive particles.

Another known filler material is oil, and preferably a highly viscous oil. A flexible sealing ring is then used to close the play at the outlet. Unfortunately, known sealing rings deteriorate rather rapidly under the effects of temperature variations and impacts from abrasive particles.

Preferred implementations of the present invention protect a limited-displacement mechanical system against an aggressive medium in a simple and long-lasting manner which is reliable, even when the aggressive medium is subjected to large variations in pressure and in temperature and conveys abrasive particles.

SUMMARY OF THE INVENTION

The present invention provides a method of protecting a limited-displacement mechanical system from a surrounding aggressive medium, the mechanical system comprising:

operative parts which co-operate with one another via operative surfaces which come into contact for directly transmitting working forces and thus ensuring operation of the system; and at least one link member fixed to an operative part to transmit for transmitting motion outside the system;

a rigid protective chamber surrounding the operative surfaces together with an internal volume enabling displacements of the said surfaces, said chamber having at least one outlet opening for passing the link member from inside the chamber to outside the chamber, said outlet opening leaving sufficient play around the link member to enable it move;

wherein the method comprises a filling operation in which the protective chamber is filled with a filler material enabling displacements of the operative surfaces while preventing the surrounding aggressive medium from coming into contact therewith;

the improvement wherein the said filler material is a soft resilient high polymer obtained by solidifying a liquid starting material for which solidification causes chemical bonds to be formed therein without causing a substantial change of volume, said high polymer having a tensile strength of 3 to 30 newtons per square millimeter, a shear strength of at least 20 newtons per centimeter, and an elastic limit of at least 150%, whereby deformation suffered by the said material in operation of the system is reversible and whereby the resistance opposed by said material against such deformation does not substantially modify the operation of the system;

the said filling operation taking place with the starting material in the liquid state, and the said solidification taking place after filling;

the filling operation being preceded by a surface preparation step during which at least the internal surface of the said chamber and the surface of the link member inside the chamber receive, at least in the vicinity of the said outlet opening, an adherence coating to ensure that the filler material adheres to said surfaces with a tensile strength of at least 3 newtons per square millimeter;

the said play being large enough to enable displacements of the said link member without exceeding the elastic limit of the filler material in the vicinity of the said outlet opening.

BRIEF DESCRIPTION OF THE DRAWINGS

Two implementations of the invention are described by way of example with reference to the accompanying drawings, in which:

FIG. 1 is a half axial section through a first mechanical system protected by the method of the invention, the plane of the section being referenced I—I in FIG. 2;

FIG. 2 is a half cross section through the FIG. 1 system on a plane referenced II—II in FIG. 1;

FIG. 3 shows a detail III of FIG. 2 to a larger scale; and

MORE DETAILED DESCRIPTION

Figure 4:
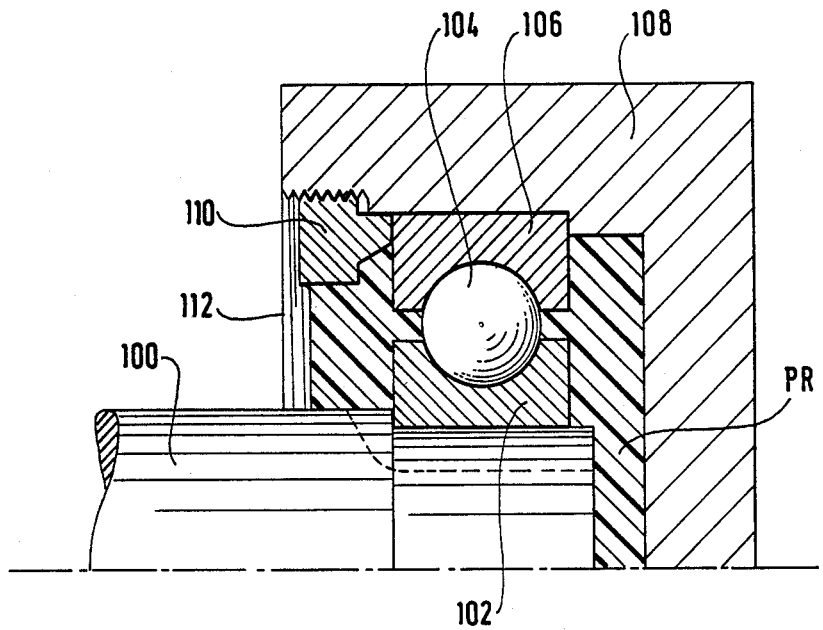
FIG. 4 is a half axial section through a second mechanical system protected by the method of the invention.

The first mechanical system described by way of example is intended to transmit axial thrust to the shaft of a turbodrill for use underground, or "downhole". It comprises a first subassembly of rotary parts which are rotatable relative to an outer body 13 and which are driven by a shaft 2 about an axis 22, together with a second subassembly of non-rotary parts which are connected to the outer body in such a manner as to prevent their rotating about the axis while enabling them to transmit axial thrust to the outer body.

The first subassembly includes a plurality of friction rings such as 1 disposed successively along the shaft, and each capable of being provided with two oppositely directed friction surfaces (only one of which is shown) each of which rubs against the single friction surface of a co-operating friction ring such as 6 which forms part of the second subassembly. The second subassembly also includes resilient thrust members 17 bearing against the rear faces of the friction rings 6 to urge them axially forwards to maintain permanent thrust on the friction rings 1 of the first subassembly, while nonetheless enabling small axial displacements of the friction rings. The thrust members 17 also bear against respective frames 12. The second subassembly further includes fixed guide sleeves 33 which are fixed relative to the frame 12 and moving guide sleeves 28 which are movable relative to the frames 12 and which are coaxial with the shaft 2. Each moving guide sleeve 28 bears rigidly against a corresponding one of the friction rings 6. Moving grooves 30 and fixed grooves 32 extend axially in the facing surfaces of the moving sleeves and fixed sleeves respectively. A ball 31 is disposed in each pair of facing grooves.

The balls have sufficient play to enable easy axial displacement of the moving sleeves relative to the fixed sleeves. Although the play is not slack enough to permit the moving sleeve to move in rotation about the shaft axis, it does enable the moving sleeve to tilt freely in a periodic wobbling or nutating manner, thereby enabling the friction rings to remain in close contact to evenly distribute the axial load over their entire friction surfaces in spite of inevitable small errors in the perpendicularity of these surfaces to the shaft axis. In other words, supposing that the friction ring 1 is slightly out-of-true, the friction ring 6 can remain in intimate contact therewith by virtue of the moving sleeve 28 being free to wobble. Such imperfections can arise during manufacture of the motor, or else they can be induced by drilling in a borehole that is curved. Whatever the cause, the resulting uneven friction can result in rapid deterioration of the friction surfaces in operation.

The frame 12 which is fixed to the outer body 13 is in the form of an annular plate having openings 23 for passing the drilling mud which is used to drive the turbine.

The grooves in the moving sleeve include front and rear end stops to prevent the balls from escaping. The wobbling mounting is designed for a maximum expected deflection of the friction ring 1 from the true perpendicular to the shaft axis of less than 1/100 of a radian. With conventional turbodrills, the risk of a curved borehole imposing a greater deflection is very slight.

The resilient axial thrust member 17 may be constituted, for example, by a frustoconical steel washer of the type sometimes referred to as a "Belleville" washer. It is compressed between the rear face of the moving sleeve 28 and the frame 12.

The stroke of the balls 31 is limited only by rear end stops in the fixed grooves 32. This means that the balls may be initially inserted radially into the grooves of the moving sleeve before it is pushed fully home into the fixed sleeve against the resilient thrust of the washer 17. The ball can then be slid axially into the facing pairs of grooves, and the moving sleeve can then be pushed home, with the balls being free to drop to the rear end stops of the grooves.

The mechanical system that needs protection is thus constituted by the following components: the rigid chamber is constituted by the fixed sleeve 33, which also constitutes one of the operative parts; the link member is constituted by the moving sleeve 28 which also constitutes one of the operative parts; other operative parts are constituted by the balls 31 and by the resilient washer 17; and the outlet opening OS is the annular opening of the fixed sleeve 33 in the transverse contact plane between the moving sleeve 28 and the ring 6.

Compensation openings OC are also made through the rear of the fixed sleeve 33.

In accordance with the present invention and, for example, after the balls 31 have been inserted, the inside volume of the guide sleeve is filled with a priming liquid which is then removed, leaving the above-mentioned adherence coating on the walls of the volume. The liquid is naturally chosen to match the materials in use.

The liquid could alternatively be prior deposited on the parts that constitute the mechanism (e.g. by spraying or by brushing), thereby enabling adequate drying.

The above-mentioned filling operation is then performed. To do this, the compensation openings OC are closed and the axis 22 is disposed vertically with the outlet openings directed upwardly and the balls 31 moving under gravity to the bottoms of the grooves 30 with the moving sleeves being at the tops of their strokes and just touching the washers 17.

The initially highly-fluid liquid material is slowly poured into the outlet openings OS until they are full. Bubbles may be removed from the liquid by vacuum pumping and then returning to atmospheric pressure.

The resilient filler material then polymerizes at ambient temperature (or at a higher temperature to speed up the operation). The polymerized material is referenced PR in the figures.

Contrary to what might reasonably have been feared, it should be noted that experience shows that the resilient material does not hinder operation of the system. More particularly, it seems that at the beginning of system operation numerous chemical bonds within the material are broken in the zones where the balls 31 move in contact with the sides of the grooves 30 and 32, and where there are high stresses (e.g. greater than 100 newtons per square millimeter ($N/mm^2$)). The filler product then behaves rather like a liquid, whereas in all other zones inside the protection enclosure, it retains the coherence of a solid.

Not only does the material avoid hindering the operation of the above-described system, it contributes directly to its operation. It serves as a centering means for keeping the balls 31 in a given plane, ie. in positions distributed about a circle which is coaxial with the fixed and moving sleeves when the sleeves are coaxial. This is the starting position from which the moving sleeve can tilt the most easily about any tilt axis.

Further, variations in the volume of the material PR inside the enclosure 33 due to movements of the working parts are made possible by elastic deformation of the material as cast through the compensation orifices OC without the material tearing or becoming unstuck from the metal walls.

A second mechanical system which is protected in accordance with the invention is shown in FIG. 4.

It comprises a bearing for a shaft 100 performing alternating rotations of limited amplitude, e.g. through 10°.

The shaft 100 is transversely supported by a ball bearing including an inner cage 102, balls 104, and an outer cage 106 mounted in a housing 108. The housing is partially closed by a thick washer 110 which is screwed into the housing. All the above-mentioned parts are made of steel. The remainder of the housing is filled with protective filler material PR.

The operative parts are constituted in this case by the inner and outer cages 102 and 106 and by the balls 104. The link member is constituted by the shaft 100 and the protective chamber is constituted by the housing 108 and the washer 110. The outlet opening is constituted by the central hole 112 and the washer 110.

The outlet play could be reduced by making the washer 110 out of rubber, and then fixing the washer with glue.

Generally speaking the filler material should at least preferably satisfy the following conditions:

(1) the material should adhere excellently to the wall material (e.g. metal) of the protection enclosure and of the link part, and if possible, the adherence should be at least as strong as the internal strength (in shear or in tension) of the material itself, ie. about 3 to 30 $N/mm^2$ (for traction); and (2) since the material will be subjected to internal tearing and extension stresses due to the movements of the system, the material should accommodate itself to these internal movements by means of high tearing strength, e.g. between 20 and 200 N/cm, and should be capable of very great elongation (e.g. 150% to 700%).

The internal mechanical work done by the material will generate heat which the material must be able to evacuate easily. Its thermal conductivity must therefore be as high as possible, by way of example 0.25 W/m.K, and in any case at least 0.1 W/m°K.

Some working conditions have particular need for such a protective filler material, e.g. conditions subjected to a medium full of sand or other abrasive dust. Such abrasive substances require the filler material to be abrasion resistant. Elastomer type materials are found to have very high resistance to abrasion for hardness in the range 20 to 70 on the Shore A scale.

The movements of the mechanical system deform the filler material which consequently exerts opposing forces on the system. These forces should be as small as possible, and this may be achieved by using materials for which Young's modulus lies in a preferred range of 0.5 to 20 $N/mm^2$.

The material may be selected from the range of special chlorosilanes or siloxanes sold by the French firm Rhône Poulenc under the trade mark Rhodorsil EVF.

In contrast, in spite of having suitable mechanical and adherence properties, natural rubbers and artificial elastomers such as polybutadiene are more difficult to use and could require very expensive equipment for their installation.

I claim:

1. In an operative limited-displacement mechanical system protected from a surrounding aggressive medium, said mechanical system comprising:

operative parts having hard operative surfaces in moving contact with each other in working zones for directly transmitting working forces in operation of said system, said operative parts having limited displacements, surrounding parts defining a protective chamber surrounding said operative surfaces together with an internal volume enabling said limited displacements of said operative parts, at least one rigid link part fixed to one of said operative parts for transmitting motion thereof outside said protective chamber, said link part having therefor transmission motion between extreme positions, said protective chamber having at least one outlet through which said rigid link part passes defining an outlet gap around said link part for enabling said transmission motion, and a filler material filling said protective chamber for protecting said mechanical system from said surrounding aggressive medium, the improvement comprising:

said filler material including at the same time portions in a resilient state and portions in a liquid-like state, said filler material portions in said resilient state being made of a high polymer which chemical bonds therein, said high polymer having a tensile strength of 3 to 30 newtons per square millimeter, a shear strength of at least 20 newtons per centimeter, and an elastic limit of at least 150%, said system comprising means for adhering said filler material portions in said resilient state to said operative, surrounding and link parts in said protective chamber, said outlet gap being filled with an outlet filler material which is a said portion of said filler material in said resilient state and which is subject to deformation during said transmission motion, said outlet gap being large enough beyond said extreme positions of said link part such that said deformation of said outlet filler material never exceeds said elastic limit of said filler material in said resilient state, said filler material including said portions in said liquid like state at least in said working zones, said filler material portions in said liquid like state being made of said high polymer in which some of said chemical bonds have been destroyed by said working forces, whereby, at the same time, overpressures of said surrounding medium can be accommodated by said outlet filler material which is backed up by the remaining portions of said filler material filling said chamber, said chemical bonds enable said outlet filler material to resist said aggressive surrounding medium, and said filler material does not hinder said limited displacements of said operative parts.

2. The system according to claim 1, wherein said filler material has a thermal conductivity of greater than 0.2 W/m°K.

3. The system according to claim 1, wherein said filler material has a hardness lying in the range of 20 to 70 on the Shore A scale.

4. The system according to claim 1, wherein said filler material has a Young's modulus in the range of 0.5 to 20 N/mm$^2$.

5. The system according to claim 1, wherein said means forming said rigid protective chamber comprises at least one compensation opening for increasing the range of possible variations in the inside volume of said chamber by enabling the soft resilient high polymer to deform elastically through said opening.

6. The system according to claim 1, wherein said improvement further resides in said filler material being one material chosen from the group consisting of chlorosilanes and siloxanes, thus ensuring good resistance to chemical attack.

7. The system according to claim 6 or 1, wherein said improvement further resides in said operative parts being made of a metal capable of withstanding stresses of greater than 100 N/mm$^2$ in the zones adjacent to the operative surfaces in contact with other operative surfaces.

8. An improved operative limited-displacement mechanical system for operation in a surrounding aggressive medium, said mechanical system comprising:

operative parts having limited displacements in said mechanical system and having hard operative surfaces for forming a contact therebetween in at least one bearing point, said bearing point having limited displacements in at least one working zone for directly transmitting working forces for operation of said mechanical system, surrounding parts defining a protective chamber which surrounds said operative surfaces together with an internal volume enabling said limited displacements of said operative parts, and which has at least one outlet, at least one rigid link part passing through said outlet and fixed to one of said operative parts for transmitting motion thereof outside said protective chamber, said link part having limited displacements between extreme positions and defining an outlet gap therearound in said outlet, and a soft filler material filling said protective chamber for protecting said mechanical system from said aggressive medium without substantially hindering said limited displacements, a portion of said filler material which is in said outlet gap being an outlet portion which is exposed to overpressure thrusts and to erosion from said aggressive medium, the improvement comprising:

said filler material including, after operation of said mechanical system, resilient portions wherein said filler material is in a resilient state and liquid like portions wherein said filler material is in a liquid like state, said filler material in said resilient state being a high polymer including breakable chemical bonds which confer on it a tensile strength of 3 to 30 newtons per square millimeter, a shear strength of at least 20 newtons per centimeter, and an elastic limit of at least 150%, said breakable chemical bonds being breakable under deformation so as to place said filler material into said liquid like state, said resilient portions occupying zones which are distant from said working zone and in which deformations applied to said filler material by said limited displacements are relatively small whereby said relatively small deformations allow said breakable chemical bonds to be maintained, without substantially hindering said limited displacements, said outlet gap being large enough beyond any one of said extreme positions of said link part such that said limited displacements of said link part apply relatively small deformations to said outlet portion whereby said resilient portions include said outlet portion, and said maintained breakable chemical bonds allow said outlet portion to resist said erosion by said aggressive medium, said system further comprising means for adhering at least said outlet portion of said filler material to said surrounding and link parts, and said liquid like portions occupying at least said working zone wherein said limited displacements of said bearing point applies relatively great deformations which have broken said breakable chemical bonds, whereby said filler material no longer hinders said forming of said contact and said limited displacements of said bearing point while said breakable chemical bonds are maintained in said outlet portion against said thrusts of said aggressive medium thanks to said outlet portion being backed up by a plenum which is made of the remaining resilient portions and the said liquid like portions.

* * * * *